Nov. 28, 1961  J. C. HOWARD ET AL  3,010,127
SOLE MOLDING MACHINES
Filed May 3, 1960  11 Sheets-Sheet 1

Inventors
Jerome C. Howard
Jack A. Card
Gordon V. Sprague, Jr.
By their Attorney
Maxwell S. Raphael

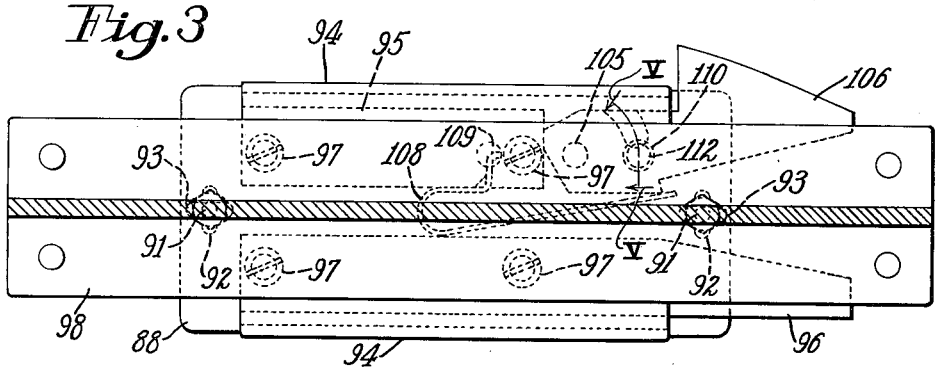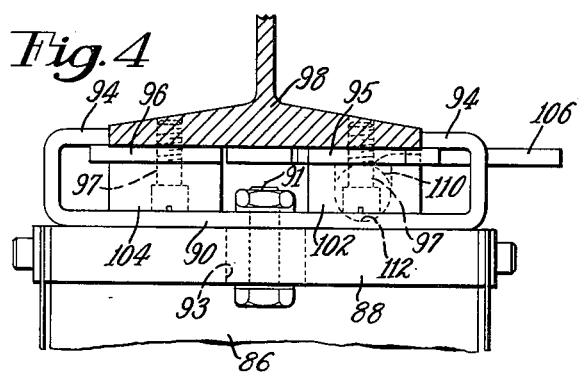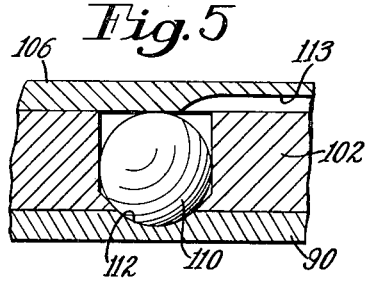

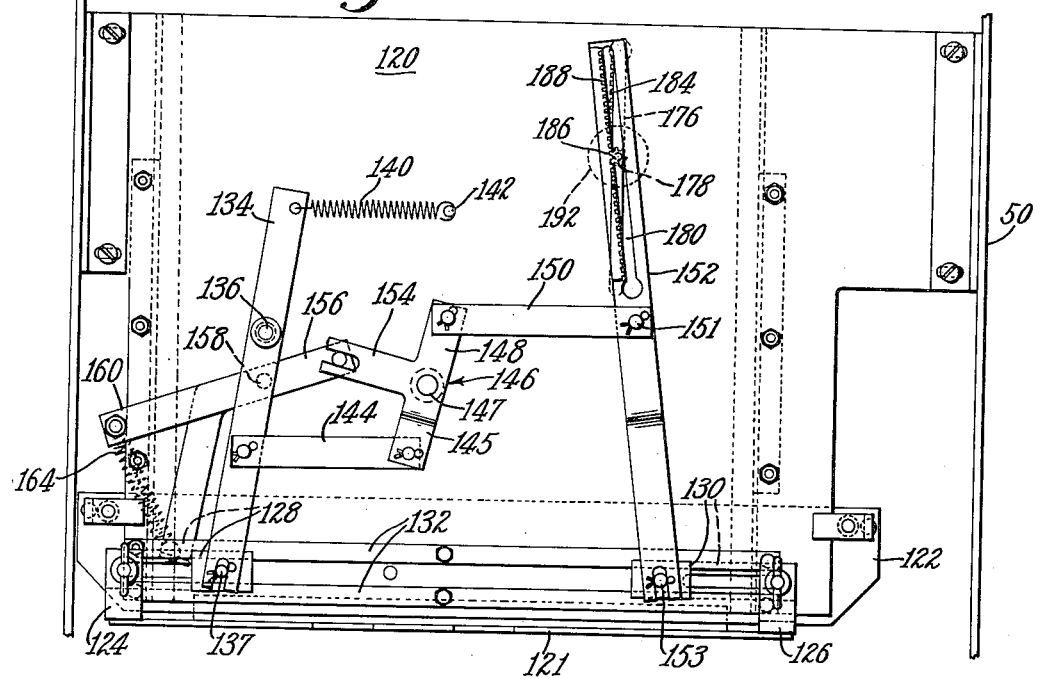
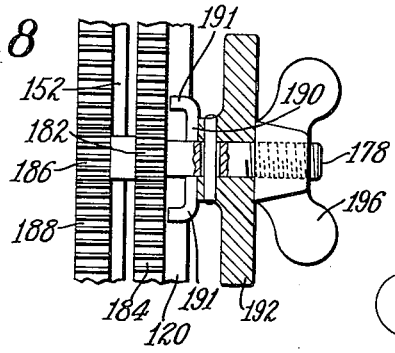
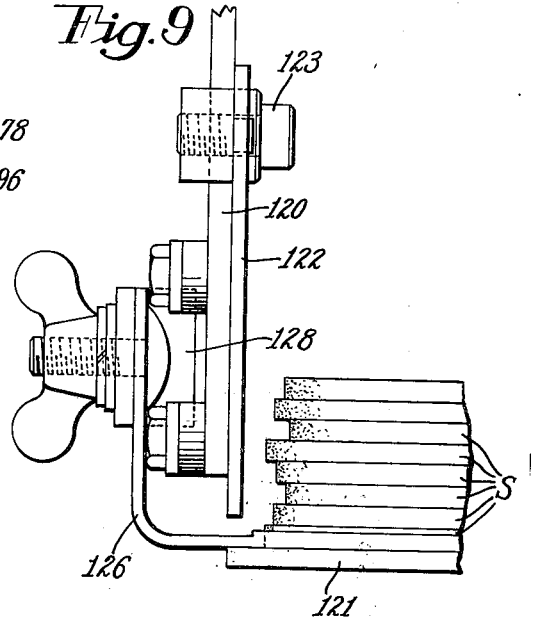

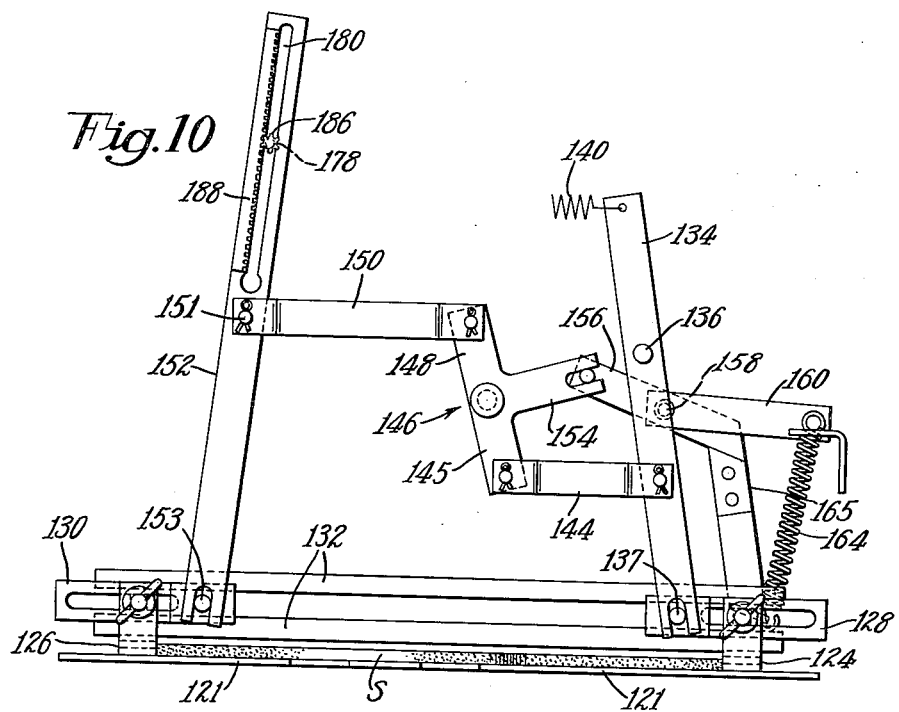
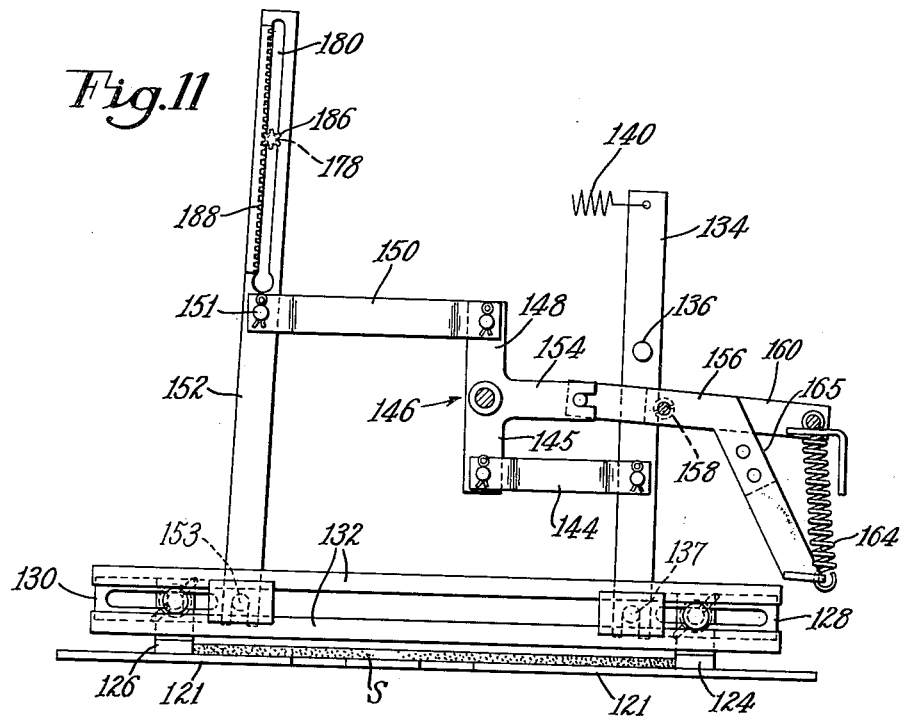

Nov. 28, 1961   J. C. HOWARD ET AL   3,010,127
SOLE MOLDING MACHINES
Filed May 3, 1960   11 Sheets-Sheet 7

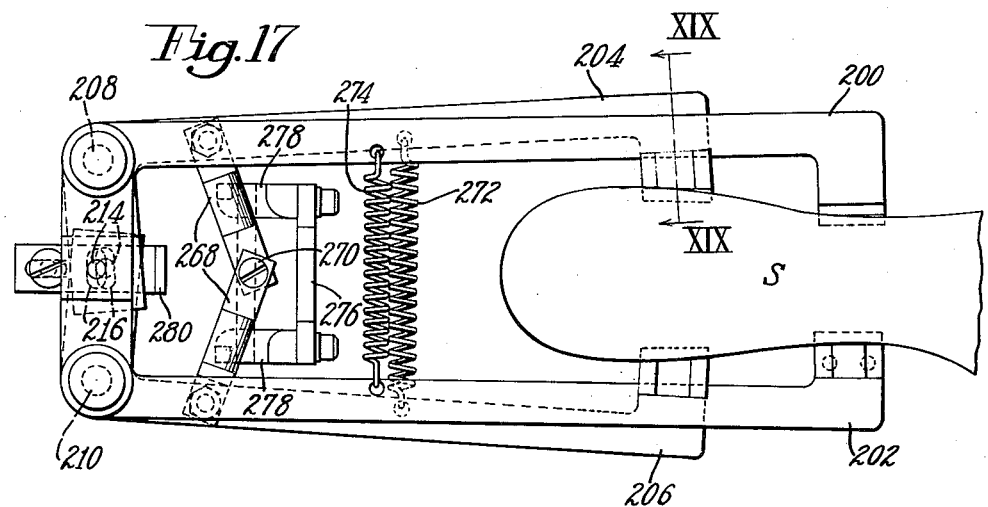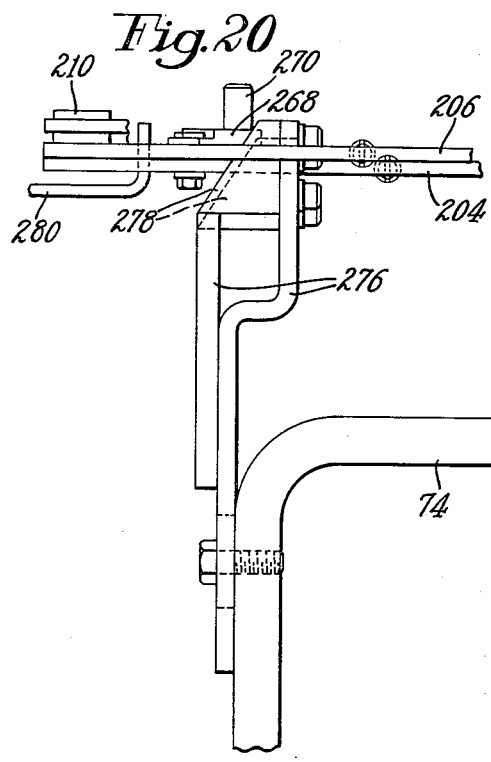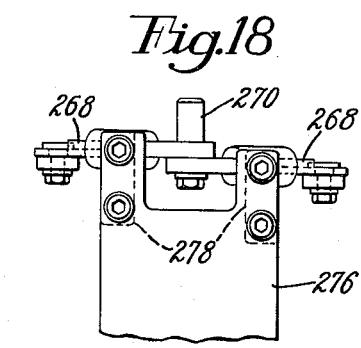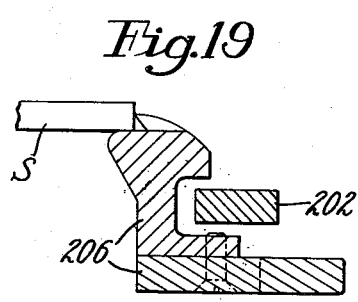

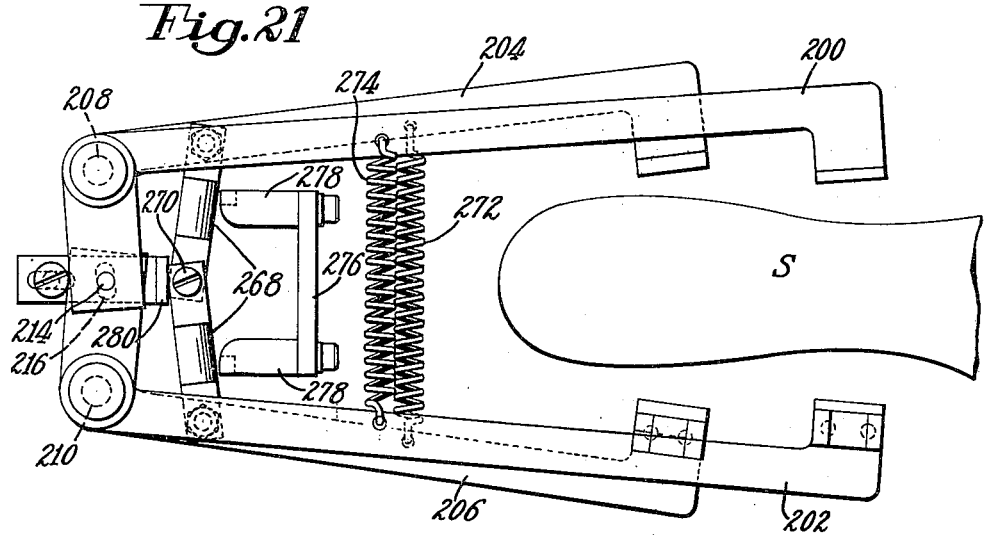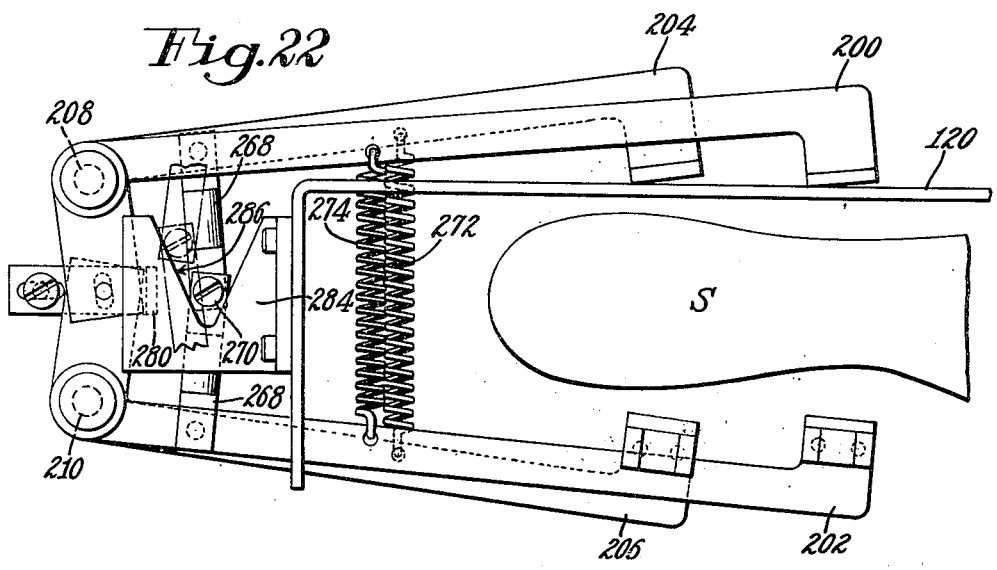

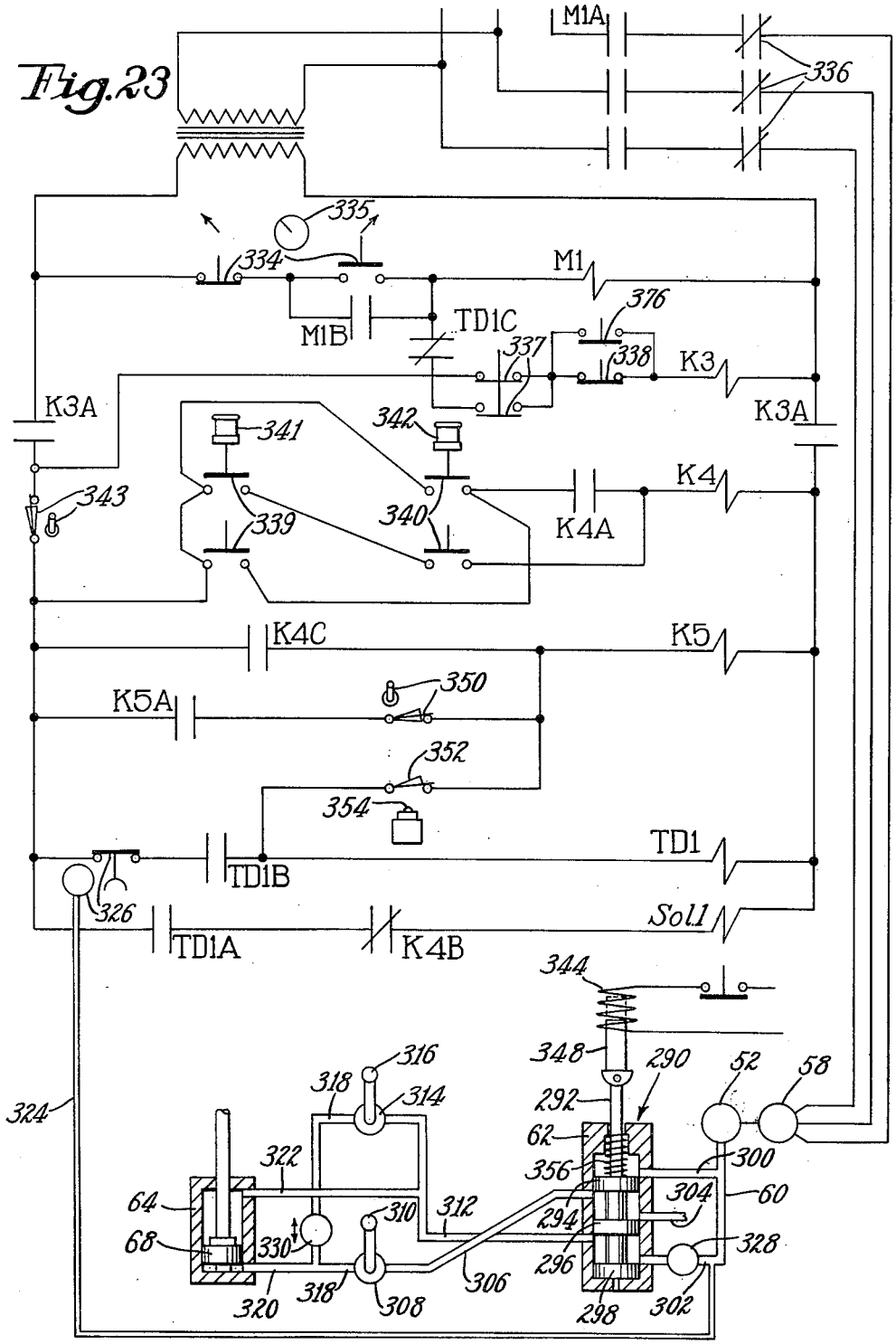

United States Patent Office 3,010,127
Patented Nov. 28, 1961

3,010,127
SOLE MOLDING MACHINES
Jerome C. Howard, Danvers, Jack A. Card, Beverly, and Gordon V. Sprague, Jr., Danvers, Mass., assignors to United Shoe Machinery Corporation, Flemington, N.J., a corporation of New Jersey
Filed May 3, 1960, Ser. No. 26,572
28 Claims. (Cl. 12—21)

This invention relates to machines for shaping shoe parts or other articles, and is herein illustrated as embodied in a twin sole molding machine adapted to operate on a pair of insoles at a time to impart to them a shape corresponding to the contour of the bottoms of lasts on which they are to be mounted in the manufacture of shoes. It is to be understood, however, that in many of its novel aspects the invention is not thus limited in its utility, but may find useful application in machines for performing other operations upon different work pieces.

It is an object of the invention to provide an automatic twin sole molding machine capable of operating at a relatively high rate to produce uniformly shaped insoles, and in which the only function required of an operator is to stack insoles in magazines provided at the two stations and to remove the molded insoles from receptacles into which they are automatically ejected from the molding stations. One operator may thus attend to several machines or, where a single machine is used, he may perform other services while the machine is operating on a run of insoles.

For accomplishing the above objective, the machine of the present invention is provided with a magazine for stacking insoles at each molding station, a pair of relatively movable co-operating mold members at each station, and gage means movable in each magazine in response to operative movement of one of the mold members into pressure applying relation to the other mold member to engage the opposite ends of the lowermost sole in the magazine and locate it lengthwise with relation to the movable mold member, and side gages adapted to engage the sides of the sole and to position it widthwise with relation to the ball line of the movable mold member, the side gages being movable, in response to the operative movement of said mold member, laterally to transfer the sole in the gaged position from the magazine to the movable mold member. Preferably, and as herein illustrated, the side gages comprise a pair of fingers or jaws which engage the sole at the opposite sides of the shank portion and a pair of shorter fingers or jaws which engage the sole at the opposite sides of its heel breast line.

In the herein illustrated embodiment of the invention, the movable mold members for the two molding stations are mounted on a common support or carrier mounted on the upper end of a piston that is operated by fluid pressure under the control of a valve actuated by a solenoid which is automatically energized in each downward stroke of the piston to maintain the machine in continuous operation. In accordance with a feature of the invention, the end gages in each magazine are interconnected for relative movement and are also connected to the opposite ends of an actuator, in the form of a spring biased bar which extends across the machine and which is swung upward by engagement with a striker or abutment member secured to the mold carrier when the latter is moved upward to cause the molds to apply pressure to the soles thereon against the co-operating fixed molds.

The side gages associated with each molding station are mounted on a carrier or slide movable laterally of the machine and transversely with relation to the movable molds. In accordance with another feature of the invention, the two slides are connected together for equal and opposite movements relative to each other by a pivoted arm that is swung in opposite directions by cam actuated means associated with the mold carrier, in such manner that, during upward movement of the mold carrier, the pivoted arm is swung in one direction to move the slides inward toward the movable mold members, to cause the gages to transfer the soles in the gaged position from the magazines to the movable mold members. During the downward movement of the mold carrier the arm is swung in the opposite direction to return the side gages to their initial positions beneath the magazines for gaging and transferring the next succeeding lowermost soles in the magazines.

The shorter pair of fingers of each set of side gages are connected together by toggle links which, in the broken position of the toggle formed by the links permit the two pairs of fingers to be urged toward each other to close upon a sole by springs connecting each pair of fingers. In accordance with a further feature of the invention, cam means associated with the movable mold carrier engage the toggle links connecting the pair of shorter fingers of each set of side gage members, near the end of the upward movement of the mold carrier, and move them to straighten the toggle, thereby causing the gage fingers to move out of engagement with the soles prior to application of the final molding pressure to the soles. Other cam means is provided at each magazine which, as each side gage carrier or slide reaches the end of its return movement toward the magazine is engaged by the pin which forms the joint between the toggle links and breaks the toggle, thereby to permit the gage fingers again to be closed by their springs on the succeeding lowermost sole in the magazine.

These and other features and advantages of the invention will be more fully explained in the following description, in conjunction with the accompanying drawings, and particularly pointed out in the claims.

In the drawings:

FIGS. 3 and 4 are detail views illustrating the mounting of each female or upper mold assembly provided at each molding station;

FIG. 5 is a sectional view taken along the line V—V of FIG. 3;

FIG. 7 is an enlarged view in side elevation of the mechanism associated with one of the magazines for gaging the soles lengthwise;

FIG. 8 is a detail view of means shown at the upper right-hand side of FIG. 7 for adjusting the rate of relative movement of the end gages;

FIG. 9 is a detail view in end elevation, looking from the right, of the lower right-hand side of FIG. 7, illustrating the mounting of one of the end gages;

FIG. 10 is a detail view in left side elevation showing the end gages gaging a large size sole;

FIG. 11 is a similar view showing the gages gaging a smaller size sole;

FIG. 17 is a plan view of the side gages in engagement with a sole;

FIG. 18 is a detail view of the side gages;

FIG. 19 is a cross sectional view taken along the line XIX—XIX of FIG. 17;

FIG. 20 is a detail view in side elevation of means for causing the gages shown in FIG. 17 to disengage the sole after depositing it on one of the movable mold members;

FIG. 21 illustrates the side gages after being disengaged from the sole by the means shown in FIG. 20;

FIG. 22 is a plan view showing the side gages at the end of their return movement to their starting position to gage and transfer a succeeding sole; and FIG. 23 is a diagram of an electrical circuit for controlling hydraulic power means for operating the movable mold members.

Figure 1:
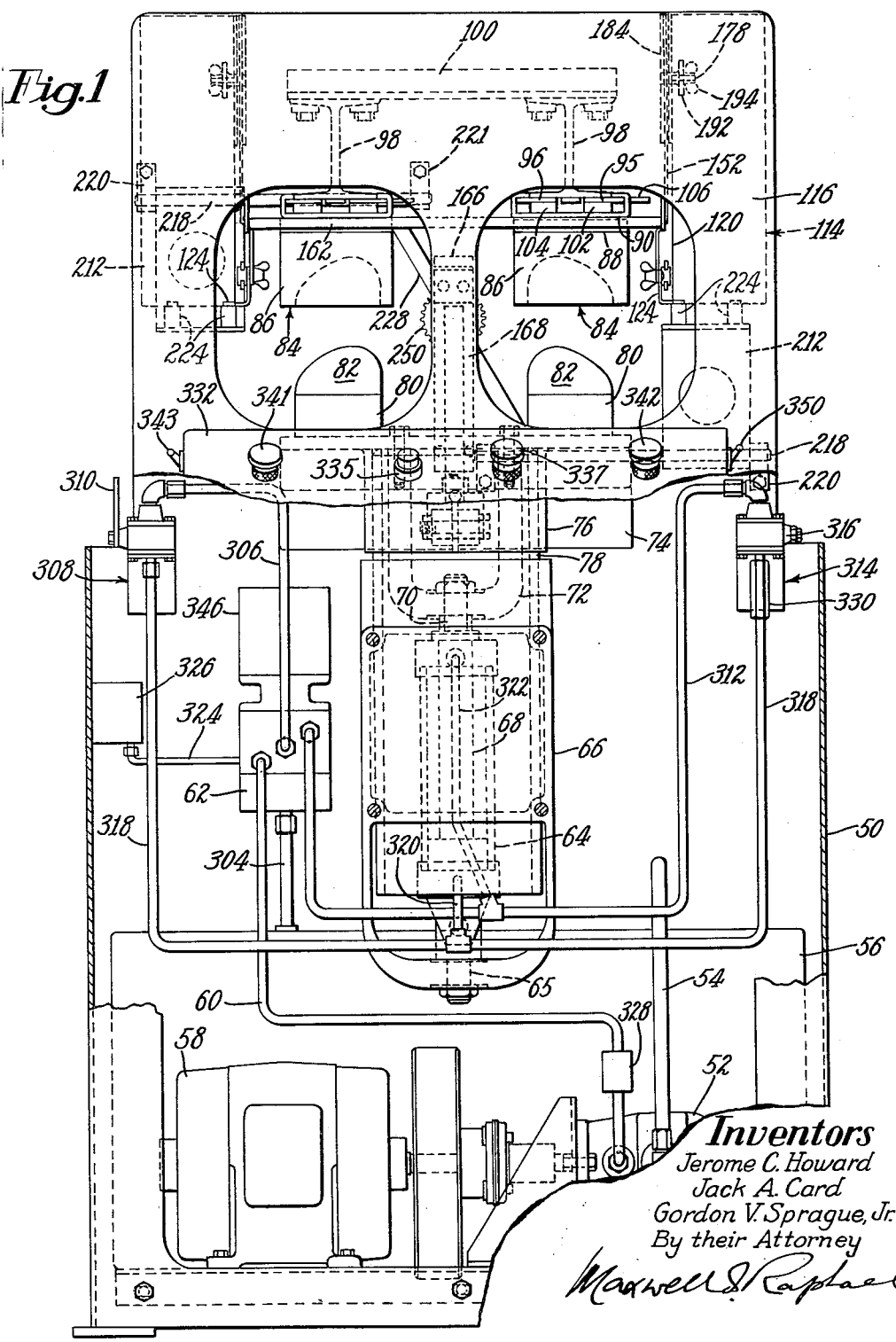
FIG. 1 is a front elevation of a twin sole molding machine embodying the invention.
Figure 2:
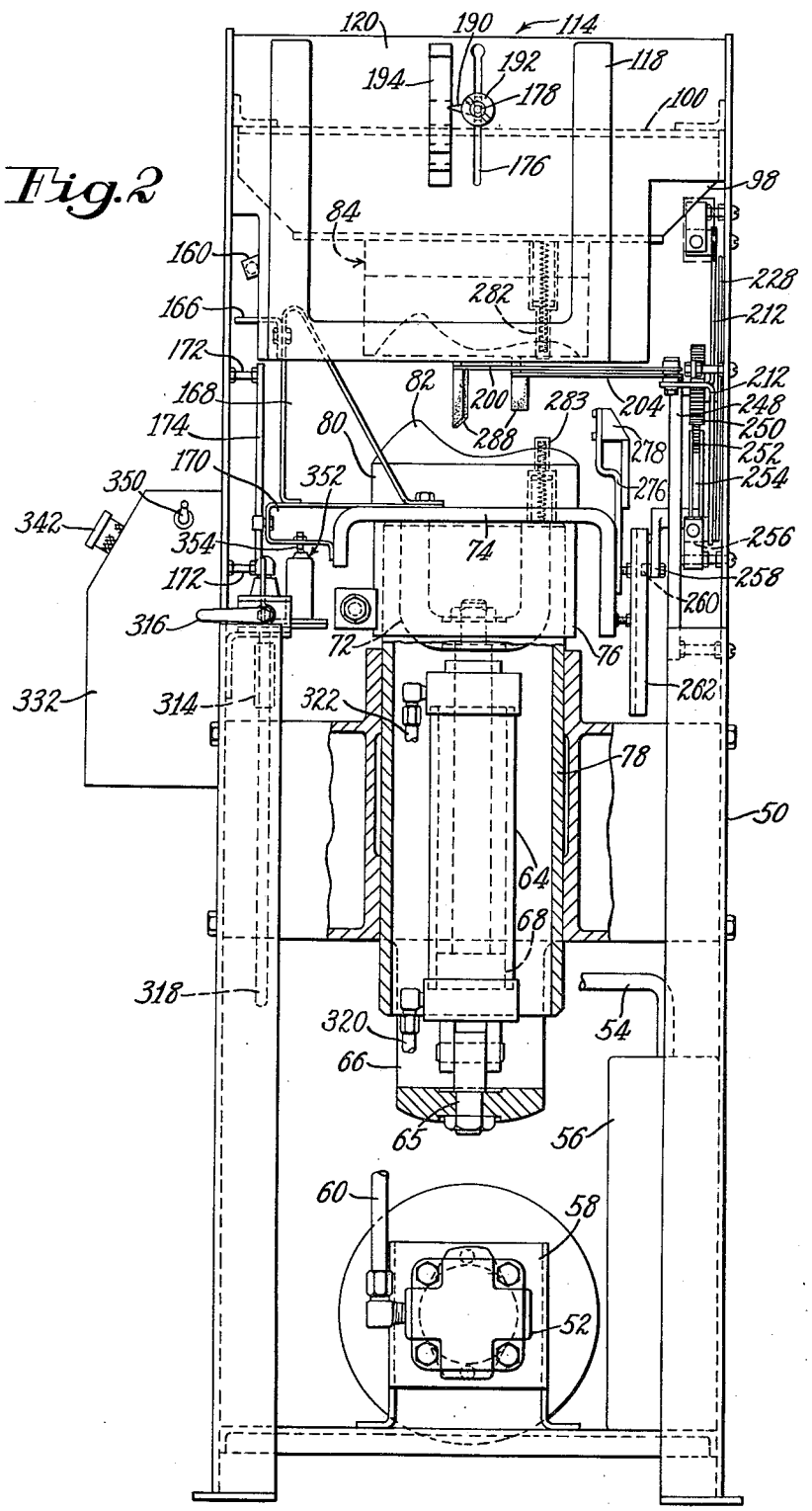
FIG. 2 is a right side elevation, partly in section, of the machine.

The invention is illustrated as embodied in a twin sole molding machine arranged to operate during each cycle on a pair of insoles for right and left foot shoes. Referring to FIGS. 1 and 2, the machine comprises a frame 50, the lower or base portion of which houses hydraulic power operating mechanism including a pump 52 connected by a tube 54 to a reservoir 56 containing pressure fluid, preferably oil. The pump is constantly driven by an electric motor 58 to deliver, through a tube 60, oil under pressure to a valve housing 62 in which a valve, later to be described, is operated to admit fluid to the opposite ends of a cylinder 64 secured by a stud 65 to the lower end of a casting or housing 66 fixed to the rear wall of the machine frame. A piston 68 operating within the cylinder has secured to the upper end of its rod a threaded extension 70, on which is mounted an adaptor 72 to which is bolted a platform or carrier 74 welded to a collar 76 which is clamped to the upper end of a guide tube 78 slidably mounted in the housing 66.

Mold member supports

On the platform or carrier 74 is mounted a pair of blocks 80, to each of which is secured a lower, or male mold member 82. Upon each upward movement of the piston 68 the mold members 82 are raised to bring a pair of soles, placed one on each mold member by mechanism to be described, into operative relation with a pair of complemental upper or female mold units 84. Each upper mold unit comprises a mold member 86 which preferably consists of a block of molded hard rubber vulcanized to a plate 88 (FIG. 4) to which a mounting bracket 90 is secured at its forward and rear ends by bolts 91 extending through longitudinal slots 92 (FIG. 3) in the bracket and through transverse slots 93 in the plate 88, whereby each upper mold unit may be adjusted lengthwise and widthwise relative to the mounting bracket 90 to locate it in register with the corresponding lower mold member 82. The mounting bracket is formed with upwardly and inwardly extending flanges 94 at its opposite sides for engagement with a pair of bars 95, 96 which are secured by screws 97 to the under side of a bracket 98 depending from a ledge or shelf 100 (FIG. 1) projecting from the upper end of the rear wall of the machine frame. Also fixed by the screws 97 to the bars 95, 96 is a pair of bars or blocks 102, 104 (FIG. 4). Pivotally mounted on the block 102 by a pin 105 is a latch 106 adapted to swing inwardly, or clockwise as viewed in FIG. 3, to permit sliding the mounting bracket 90 rearwardly of the machine when installing each upper mold unit on its supporting bracket 98. The latch swings against the tension of a leaf spring 108 secured at one end to a pin 109 in the bracket 98. The assembly is locked in place by engagement of a ball 110 mounted in the bar 102, in a socket 112 provided in the mounting bracket 90 and held in the socket when the latch is in the position shown in FIGS. 3 and 5. When the latch 106 is swung in a clockwise direction as viewed in FIG. 3, a recess 113 (FIG. 5) in the under side of the latch registers with the ball 110, permitting its movement out of the socket 112, thereby releasing the assembly for movement. By this arrangement each upper mold assembly may be installed in the machine and removed therefrom as a unit when the mold members 86 are to be replaced with others of a different shape.

The soles to be molded in the machine are stacked in a pair of magazines 114 (FIGS. 1, 2 and 12) which are mounted one at each side of the machine frame and from which the soles are transferred, by mechanism later to be described, in pairs, that is one from each magazine, and located on the lower molds 82 in position to be operated upon when these molds are raised into co-operative relationship with the upper mold members 86. Each magazine comprises side walls 116 connected together by a U-shaped front bracket 118 and attached to a rear wall formed by a plate 120 secured to the front and rear walls of the machine frame. The bottom of the magazine is formed by plates 121 fixed to the U-shaped bracket 118 below the rear wall 120, the plates 121 being spaced from each other a sufficient amount to provide room for transferring means to be described later to engage each lowermost sole in the magazine and to transfer it to the lower mold member 82. A spacer plate 122 (FIGS. 7 and 9) is secured to the rear wall 120 of the magazine by a bolt 123 extending through a slot in the rear wall, whereby the plate 122 may be adjusted at different heights relative to the bottom plates 121 in accordance with the thickness of the soles in the magazine to allow withdrawal of one sole at a time from each magazine by the previously mentioned transferring means.

Figure 15:
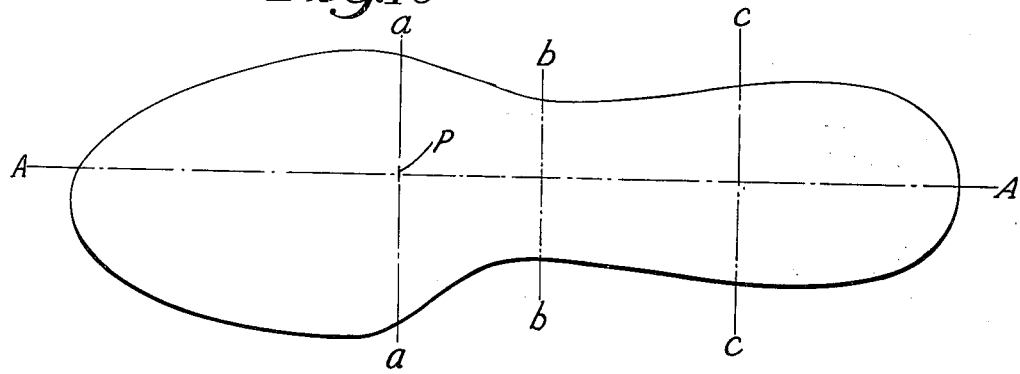
FIG. 15 is a plan view of an unmolded sole blank.

The mold members 82 are so shaped as to impart to soles placed thereon a curvature corresponding to the longitudinal and transverse curvature of the bottom of a last on which shoes of a particular style are to be manufactured. Different sets of molds are required for different shoe styles, each mold being approximately the counterpart of the last on which shoes are to be made. It is to be noted, however, that soles cut to conform to the contour of a last of any particular style show a fixed ratio between the distance from a point P (FIG. 15) on the ball line a—a of the sole (which for convenience will hereinafter be referred to as the "break" point, where the sharpest molding takes place and which coincides with the highest point on the male mold member), to the toe end of the sole, and the distance from the same point to the heel end of the sole. This ratio is the same for soles of all sizes of that particular style. It is further to be noted, as illustrated in FIG. 15, that a line A—A drawn along the longitudinal axis of a sole through the centers of the shank line b—b and of the heel breast line c—c will intersect the point P previously referred to, irrespective of the style or size of the sole.

In the organization of the illustrative machine, recognition was given to the importance of the factors mentioned above by providing mechanism so constructed and arranged that after a simple adjustment, whenever there is a change from one shoe style to another, the mechanism will operate automatically to locate the lowermost sole in each magazine, in both the longitudinal and lateral directions, in position to be transferred and placed on the lower molds so that the "break" point of each sole, whatever its size may be, will coincide with the corresponding high point on each lower mold, and the longitudinal line A—A intersecting the "break" point will coincide with the corresponding line on the mold.

Mechanism for positioning soles lengthwise

The mechanism provided by the present invention and associated with each magazine for positioning the soles lengthwise with relation to the lower mold comprises a pair of end gages 124, 126 (FIGS. 6, 7, 10 and 11) arranged to be moved into and out of engagement respectively with the toe and heel ends of each successive lowermost sole in the magazine. The gages are adjustably secured to blocks 128, 130 mounted for horizontal sliding movement on a pair of spaced parallel bars 132 secured to the rear wall 120 of the magazine. The slide blocks 128, 130 are connected together for simultaneous relative movement of the end gages 124, 126 by linkage comprising a lever 134 pivoted at a point intermediate its ends on a stud 136 mounted in the plate 120, the lower end of the lever being pivoted to the block 128 by a pin 137 carried by the block and extending through a slot in the lower end of the lever. To the upper end of the lever 134 is attached one end of a spring 140, the other end of which is attached to a pin 142 projecting from the plate 120. The lever 134 is pivotally connected, at a point intermediate the pivots 136, 137, by a link 144 to one arm 145 of a T-shaped lever 146 which is pivoted at 147 on the plate 120. Another arm 148 of the lever 146 is pivotally connected to one end of a link 150, the other end of which is connected by a pin 151 to a lever 152 pivoted at its lower end on a pin 153 extending through the slide block 130 on which the heel end gage 126 is mounted. A third arm 154 of the lever 146 is pivotally connected to one end of a lever 156 pivoted at 158 on the plate 120. Also pivoted at 158 is an arm 160 to which is secured one end of an actuator, in the form of a rod or bar 162 extending across the front of the machine. The other end of this bar is secured to a similar arm 160 at the opposite side of the machine, whereby the end gages of both magazines are actuated simultaneously, in a manner presently to be described, to position the lowermost soles in the two magazines lengthwise. A spring 164 attached to each end of the actuating bar 162 connects this bar to the lower end of the lever 156 forming a part of the means connecting the end gages in each magazine, the spring tending normally to maintain the arm 160 in engagement with an abutment member 165 on the lever 156. The bar 162 is lifted to actuate the means connecting the end gages associated with each magazine, during the upward movement of the mold carrier 74 to move the lower mold members 82 toward the two upper mold members 86, by engagement of the bar with a striker or abutment plate 166 (FIGS. 1, 2 and 6) fastened to the upper end of a bracket 168 fixed to the upper surface of a member 170 secured to the top of the mold carrier 74. The mold carrier 74 and the guide tube 78 are guided in their heightwise movement, so as to resist rotation of the guide tube, by rolls 172 which are mounted on pins projecting rearwardly from the member 170 and which are in engagement with the sides of a guide rail or upright 174 bolted to the rear wall of the machine frame.

A magazine may contain a stack of insoles of the same size or of assorted sizes, and it is also possible to stack insoles of one size in one magazine and of a different size in the other. The end gages 124, 126 will be moved relatively in such manner as to locate each sole, of whatever size, so that the "break" point on the sole will coincide with the highest spot on the lower mold. It will be evident that the end gages 124, 126 will travel a shorter distance toward the ends of a large sole, and hence would engage the sole sooner in the upward movement of the mold carrier 74 than they would in moving toward a sole of a smaller size, that is, before the mold carrier has completed its upward movement. When the gages are first caused to move, by engagement of the abutment plate 166 with the actuator bar 162, toward the toe and heel ends of the lowermost sole in each magazine, the arm 160 and the lever 156 swing in unison about their common pivot 158. After engagement of the gages with the ends of a large size insole and during continued upward movement of the mold carrier, the springs 164 connecting the bar 162 and the levers 156 at the opposite sides of the machine will yield and the arms 160 will swing independently of the levers 156, which will at that time be prevented from swinging further by the resistance to further movement of the toe gages 124 to which the levers are connected through the previously described linkages.

The arrangement just described affords a certain amount of flexibility in the use of the machine for the simultaneous molding of soles of different sizes. Thus, for example, one magazine may hold soles of a certain size, while the other may hold soles of a different size, as illustrated in FIGS. 10 and 11. The yielding connection between the actuator bar 162 and the levers 156 connected to the linkage connecting together the end gages operating in each magazine enables the gages in the magazine containing soles of a small size to continue their movement toward the ends of those soles after the movement of the gages toward the ends of the larger size soles in the other magazine has been stopped.

It has been explained earlier that there is a fixed ratio between the distance from the "break" point to the toe end and that between the same point and the heel end of a sole, and that this ratio is constant for soles of all sizes. Thus, for example, in the case of the sole illustrated in FIG. 15, which is intended for a high heel shoe and will therefore be rather sharply molded, the relative lengths of the forepart and the rear portion of the sole are approximately in the ratio of 1:1.5, and this ratio will be the same for all sizes of soles for shoes of the same style. The end gages 124, 126 must, accordingly, be set to move relatively to each other in substantially the same ratio in order to insure proper gaging of soles of all sizes. The ratios for soles of different styles may vary within a range extending roughly from 1:1 to 1:3. Since these ratios are readily determinable, it is possible to adjust the gage operating mechanism in such manner as to impart to the gages relative movement toward the opposite ends of each sole at corresponding rates.

For thus varying the rate of relative movement of the end gages 124, 126 the following means has been provided in the illustrative machine. Referring more particularly to FIGS. 2, 7 and 8, there is provided in the plate 120 a vertical slot 176, through which extends a shaft 178 which also extends through a similar slot 180 provided in the lever 152. The shaft 178 carries a pinion 182 which meshes with the teeth of a rack bar 184 secured to the plate 120 at one side of the slot 176. A second pinion 186 on the shaft meshes with the teeth of a rack 188 carried by the lever 152. Freely mounted on the shaft 178 is a pointer 190 formed with prongs 191 which engage in the slot 176 provided in the plate 120. A pin extending through a slot in the shaft 178 secures to the shaft a knurled knob 192 by means of which the shaft and the pinions 182, 186 may be rotated to locate the pointer 190 in register with any one of a plurality of indicia on a dial plate 194 fixed to the front face of the plate 120, said indicia corresponding to the ratios at which the heel end gage 126 in each magazine is to move relative to the toe end gage 124 to position soles of different sizes but of the same style in the magazine. A wing nut 196 threaded on the shaft 178 locks the pointer and the pinions in the adjusted position. Movement of the pointer to register with different ratio indicia on the dial plate will shift the pinions 182, 186 so as to increase or decrease the distance between them and the pins 151 and 153, thereby varying the ratio of movement of the lever 152 connected to the heel gage relative to the movement of the lever 134, which is connected to the toe gage and which swings about the fixed pivots 136, 137. Thus the heel gage may be caused to move relative to the toe gage in the ratio of 1:1, 1:2, or 1:3, or any intermediate ratios, according to the style of shoes for which the soles to be molded are intended.

*Sole centering and transferring mechanisms*

After the lowermost sole in each magazine has been gaged lengthwise by the end gages 124, 126 it is engaged by means which locate it in the widthwise or lateral direction so that the longitudinal line which intersects the "break" point of the sole will coincide with the corresponding line of the lower mold, and which also transfer the sole in the gaged position to the molding station. There is a sole gaging and transferring means associated with the magazine at each molding station. Each of the means in question comprises a pair of side gages or fingers 200, 202 (FIGS. 6, 12, 14 and 17) which engage the sole S at the opposite sides of its shank portion and a second pair of gages or fingers 204, 206, shorter than the fingers 200, 202, and which engage the sole at the opposite sides of its heel breast line. The shank and heel breast engaging fingers of each pair are pivoted on studs 208, 210 mounted in a bracket or carrier 212, and they are also pivoted together for equal and opposite movements by pins 214 projecting from the fingers 200, 204 and engaging in slots 216 in the fingers 202, 206.

Each carrier 212 is mounted for reciprocating movement laterally of the machine toward and away from the lower mold 82 at each molding station on a rod 218 which is secured at its opposite ends to blocks 220, 221 fixed to the machine frame and which extends through blocks 222, 223 projecting from the rear of the carrier. The carrier 212 is guided in this movement by rolls 224 which are in engagement with a guide bar or rail 226 secured to the machine frame. The two edge gage carriers 212 are interconnected for equal and opposite movements by an arm 228 pivotally connected at each of its ends by a pin 230 (FIGS. 12 and 13) to a block 232 through which extends the inner end of a rod 234 the outer end of which is threaded into a block 236 pivoted to each carrier 212. Surrounding the rod 234 between the blocks 232, 236 is a spring 238 which will yield if the transferring mechanism operating at each molding station should encounter any obstruction during the movement of its associated carrier 212 away from the lower mold member 82. Other means, to be described later, is provided for insuring against damage to the transferring mechanisms which may be caused by obstruction to the free inward movement of the carriers 212 toward the lower mold members.

The arm 228 is mounted about midway of its length on a shaft 246 (FIGS. 6 and 12) journaled in bearings in the machine frame and in a bracket 248 fixed to the frame. The shaft 246 carries a gear 250 which meshes with a gear segment 252 formed on the upper end of a lever or arm 254 which is freely mounted at its lower end on a shaft 256 journaled in the bracket 248. Pinned to the shaft 256 is the upper end of an arm or link 258, in the lower end of which is a pin 259 carrying a cam roll 260 engaging in a cam groove 261 formed in a plate 262 which is bolted to the rear of the mold carrier 74. Also pinned on the shaft 256 is a U-shaped arm or bracket 263 which is connected to the lever 254 by a rod 264 extending through the arm and the lever and having mounted thereon a spring 265 compressed between the arm 263 and a nut 266 threaded on the outer end of the rod.

Figure 6:
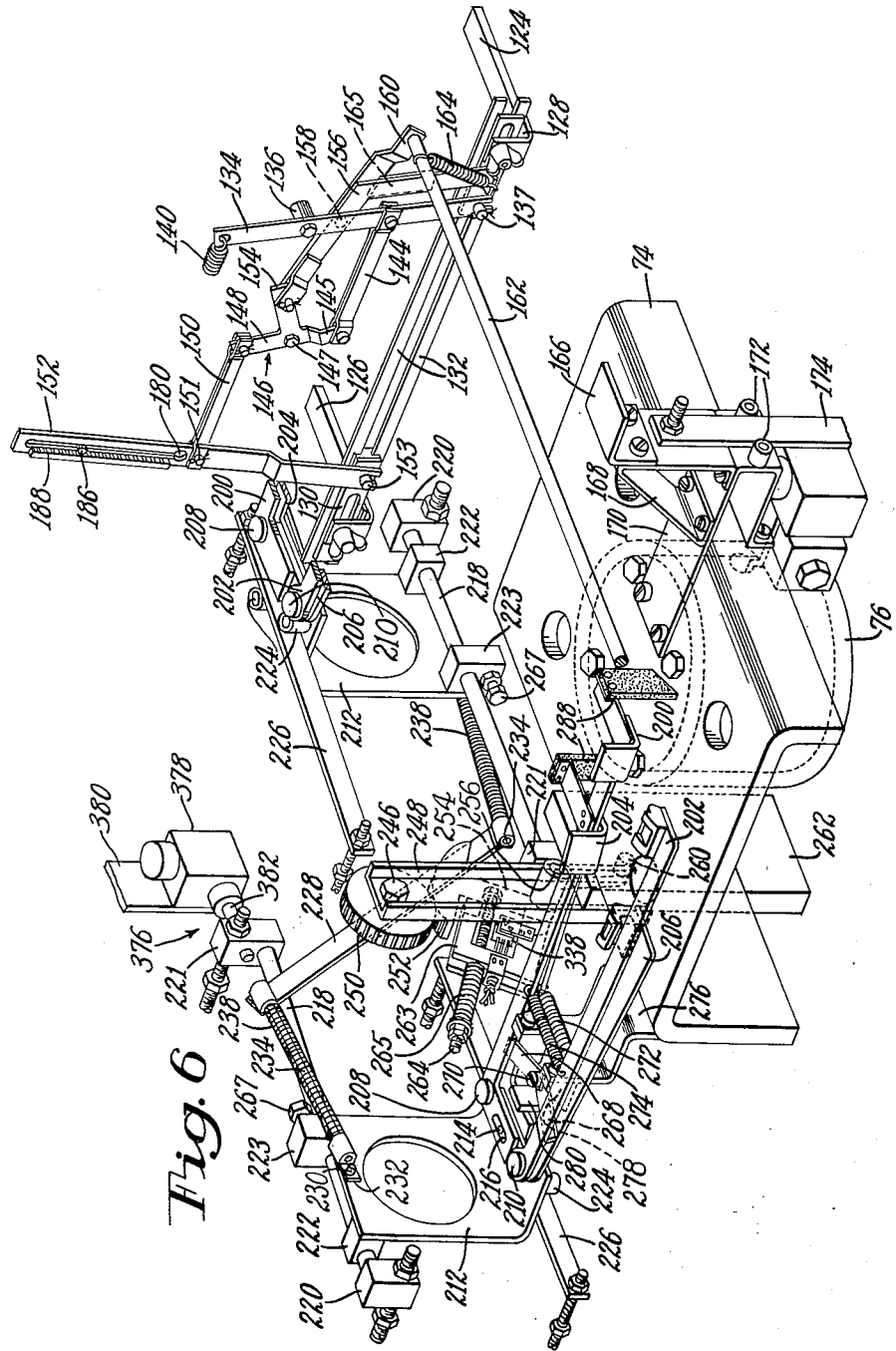
FIG. 6 is a schematic perspective view of the machine, illustrating mechanism for gaging the successive lowermost soles in the two magazines and for transferring them to the molding stations.
Figure 12:
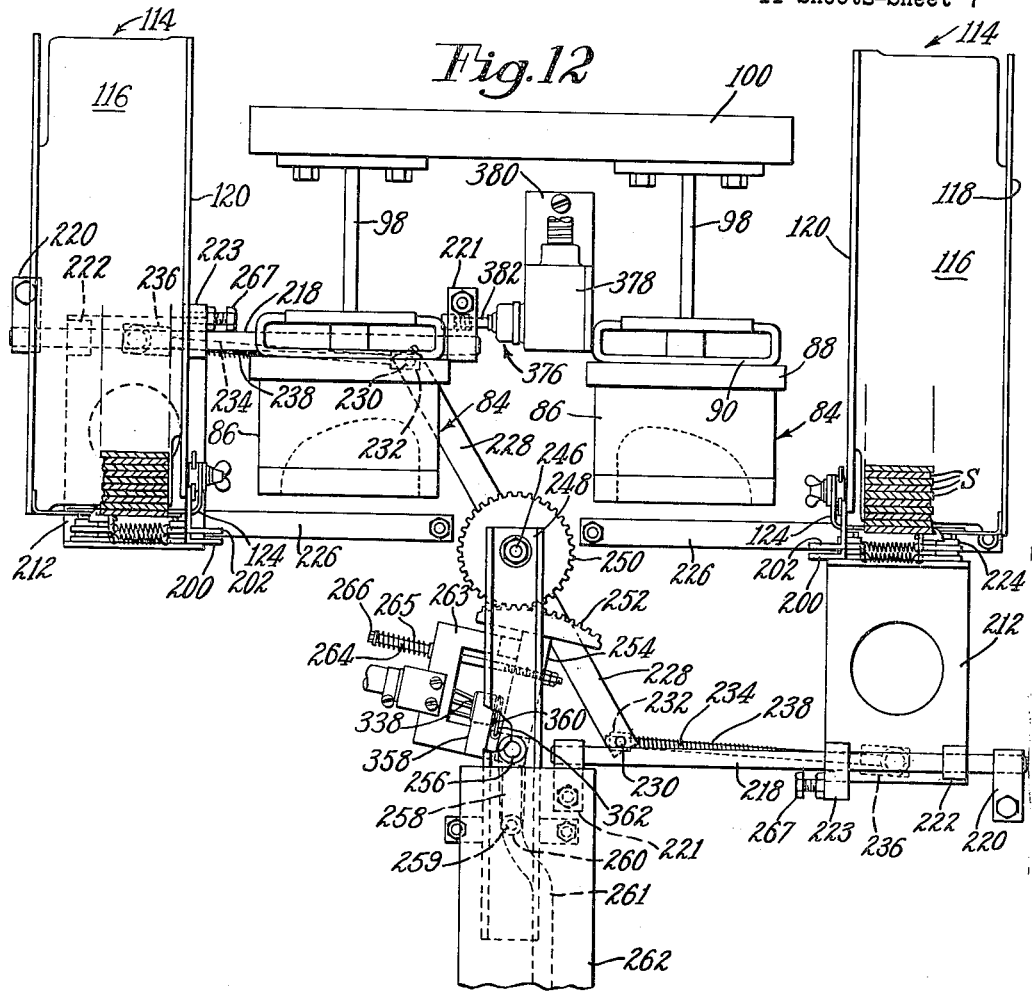
FIG. 12 is a front elevation of the head of the machine, illustrating the mechanism for gaging the soles widthwise and for transferring them to the molding stations.
Figure 13:
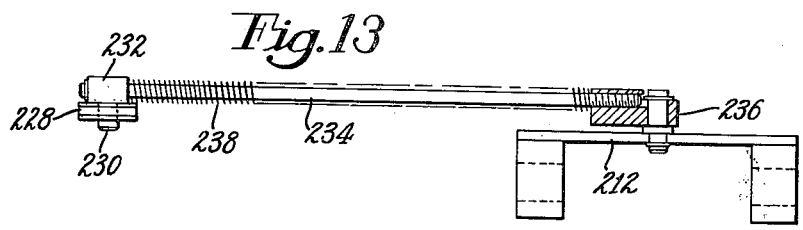
FIG. 13 is a detail view of mechanism shown in the lower right-hand portion of FIG. 12.

When the machine is at rest, the parts are in the positions shown in FIGS. 6 and 12. When the mold carrier 74 is moved up and the cam roll 260 engages the curved portion of the cam groove 261, the arm 263 is rotated by the shaft 256 counterclockwise and by moving the lever 254 which carries the gear segment 252 in the same direction, rotates the gear 250 and the arm 228 clockwise. The carriers 212, which are interconnected by this arm, are thereby moved in opposite directions inwardly toward the mold members 82 to cause the fingers 200, 202, 204 and 206 to move the lowermost soles from the two magazines into positions where they will be deposited on the mold members 82 just prior to completion of the upward movement of the mold carrier to bring the lower mold members into pressure applying relation with the upper mold members 86.

Figure 14:
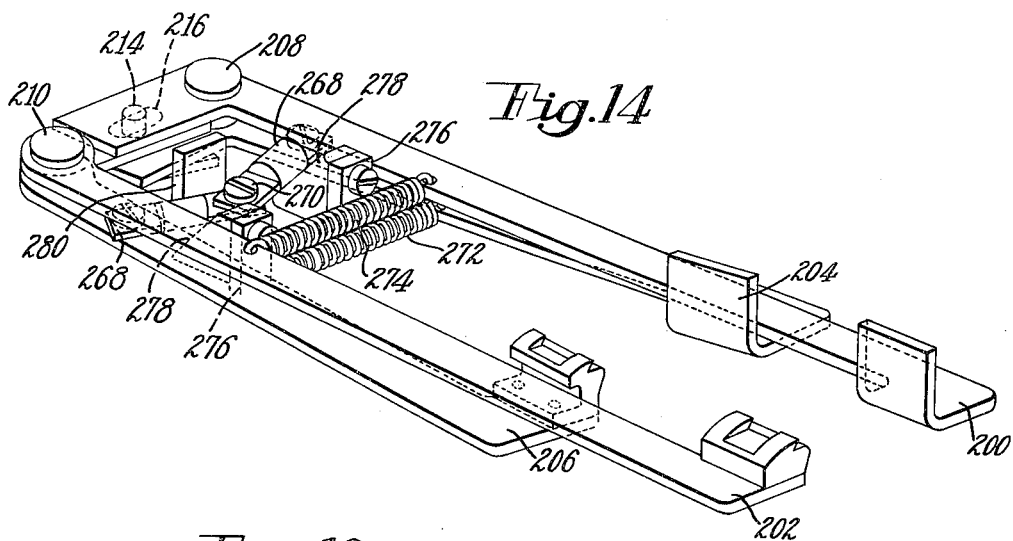
FIG. 14 is a detail perspective view of the side gages associated with each station.
Figure 16:
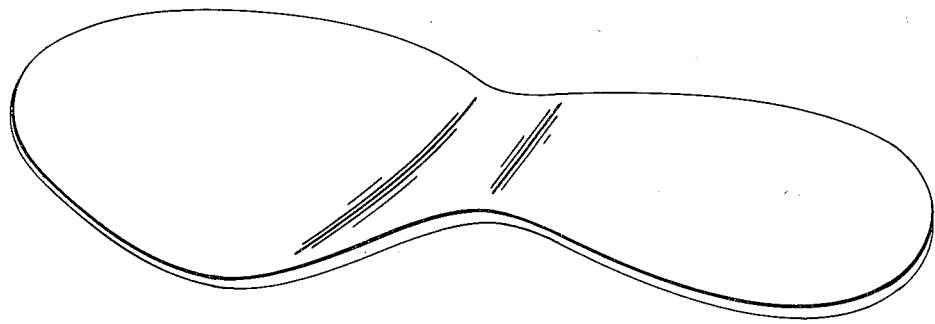
FIG. 16 is a plan view of a sole molded in the machine.

Inward movement of each carrier 212 is variably limited by engagement of an adjustable stop screw 267 threaded into the block 223 with the block 221. The shorter fingers 204, 206, which engage the sole at the heel breast line, are connected by toggle links 268 joined by a pivot pin 270. Each pair of fingers 204, 206 is also connected by a spring 272, and each pair of long fingers 200, 202 is similarly connected by a spring 274. As shown in FIGS. 6, 14 and 17, the springs tend to urge the fingers of each pair toward each other to close them on a sole. In this position the toggle formed by the links 268 is broken. The fingers remain in gripping engagement with the sole until it has been located on the lower mold member 82 just prior to the final upward movement of the mold carrier 74, as previously explained. During this final movement of the mold carrier the fingers are opened to release the sole and to permit the mold members 82 to be moved into pressure applying relation with the upper molds without interference by the fingers. For this purpose there is secured to the rear of the mold carrier 74, rearwardly of each mold member 82, an upwardly extending bracket 276 (FIG. 20), the upper end of which is formed with cam surfaces 278 arranged to engage the toggle links 268 and to cause them to swing into the positions shown in FIG. 21, in which the toggle is substantially straightened and the fingers 204, 206 are caused to swing out of engagement with the sole, against the tension of the spring 272. Swinging movement of the toggle links beyond dead center is limited by engagement of the toggle joint 270 with an adjustable stop 280 secured to the carrier 212. As the fingers 204, 206 swing out of engagement with the sole as a result of the straightening of the toggle, they engage the long fingers 200, 202 and cause them likewise to swing out of engagement with the sole, against the tension of the spring 274 by which they are interconnected. As the lower mold members 82 approach the upper mold members 86, the sole on each lower mold member is engaged by a spring pressed plunger 282 (FIG. 2) extending downwardly from the heel end portion of each upper mold member in register with a similar plunger 283 extending upwardly from the heel end portion of each lower mold member, whereby the sole is clamped between the mold members to prevent its displacement from the gaged position after its release by the fingers.

When the mold carrier 74 is moved down at the end of a molding operation, counterclockwise rotation of the gear 250 rotates the arm 228 in the same direction and the gage carriers 212 are moved outward toward the magazines, where the fingers will be in position to gage and transfer the succeeding lowermost sole in each magazine. After being opened by the straightening of the toggle, as previously explained, the fingers remain in that condition and cannot be closed again by their springs 272, 274 until the toggle is again broken. For this purpose there is secured to each magazine a horizontally extending plate 284 (FIG. 22) having a cam surface 286 which, as the carrier 212 approaches the magazine in its return movement, is engaged by the toggle joint 270, which is thereby moved to a position in which the toggle is broken to permit the springs 272, 274 to close the gage fingers on a succeeding sole. After the breaking of the toggle the gage fingers are held in the open position until the beginning of the upward movement of the mold carrier, at which time the lowermost soles in the two magazines will have been gaged lengthwise by the end gages 124, 126 operating in each magazine. The fingers are thus held open by engagement of upwardly projecting portions of the fingers 200, 204 with the lower end portion of the rear wall 120 of each magazine. During the return movement of the gage carriers 212 the sole is removed from each lower mold by ejectors which, in the illustrative machine, consist of strips 288 (FIGS. 2 and 6) of resilient material, for example rubber, depending from the inner long finger 200 of each set of gage fingers. The soles drop into a receptacle (not shown) provided at each molding station.

Mold carrier operating mechanism

The mold carrier 74 is operated to move the male mold members 82 toward and away from the female mold members 86 by pressure fluid admitted to the cylinder 64 under the control of a 4-way valve 290 (FIG. 23) mounted in the valve housing 62. The valve has a stem 292 carrying three pistons 294, 296 and 298. The interior of the valve housing is connected to the conduit 60 which leads from the pump 52 by a high-pressure fluid passage 300 above the piston 294 and a low-pressure fluid passage 302 between the pistons 296 and 298, an exhaust passage 304 being provided between the pistons 294 and 296. An outlet port in the valve below the piston 294 is connected by a pipe 306 to a manually operated valve 308 mounted at the left side of the machine (see FIG. 1) and provided with a handle 310 by which it may be opened and closed. Another outlet port in the control valve below the piston 296 is connected by a pipe 312 to a manually operated valve 314 mounted at the right side of the machine, this valve being similar to the valve 308 and provided with a handle 316 for opening and closing it. In FIG. 1, in which the machine is shown set for automatic power operation, the handle 310 of the valve 308 is in upright position, in which the valve is open, while the handle 316 of the valve 314 is in horizontal position in which the valve is closed.

The two valves 308, 314 are connected together by a pipe 318 which is in turn connected by a conduit 320 to the lower end of the cylinder 64. A conduit 322 connects the pipe 312 to the upper end of the cylinder. The line 60 is connected by a tube 324 to a pressure switch 326 which is automatically opened when the fluid in the line exceeds a predetermined pressure, which in the instant machine is of the order of 2,000 p.s.i., the pressure switch being automatically closed when the pressure drops below the predetermined value. In the fluid passage 302 there is a pressure relief valve 328 which is set to open if a pressure in excess of the predetermined maximum is developed owing to failure of the pressure switch 326 to open. A restrictor check valve 330 is connected in the line 318 which connects the two manually operated valves 308 and 314 to control the rate of flow of the pressure fluid into the lower end of the cylinder.

The electrical controls for operating the hydraulic system described above are contained in a housing or box 332 mounted on the front wall of the machine frame (see FIG. 1), and include a starting and stopping switch 334 (FIG. 23) operated by a button 335 which, when turned to the right, closes the switch, energizing the coil of a relay M1 and closing contacts M1A and M1B. The contacts M1A complete a circuit, through normally closed overload relays 336, to start the motor 58 which drives the pump 52 and the contacts M1B complete a holding circuit around normally closed contacts of the starting switch to maintain the relay energized. When a push-pull emergency stop switch 337 is next pulled out to close both sets of its contacts, current passing through the closed contacts M1B, the closed contacts TD1C of a time delay relay TD1 presently to be discussed, the switch 337, and a closed microswitch 338 that is automatically opened under conditions which will be explained below, will energize the coil of a relay K3, closing two sets of contacts K3A.

With the contacts K3A closed, when a pair of double contact switches 339, 340 are closed by depressing switch buttons 341, 342, current passing through a closed manual switch 343 located at the left hand side of the control housing 332 (FIG. 1) and through the now closed switches 339, 340 will energize the coil K4 of a relay, closing contacts K4A and K4C and opening contacts K4B. The last named contacts are connected in a circuit to a relay Sol. 1 which controls a solenoid 344 mounted in a housing 346 secured to the top of the control valve housing 62 (see FIG. 1), the plunger 348 of the solenoid being connected to the upper end of the valve stem 292 (FIG. 23).

Closing of the contacts K4C energizes the coil of a relay K5, closing contacts K5A to set up a holding circuit for the relay and to close a circuit through the coil of a time delay relay TD1, through a closed manual switch 350 located at the right hand side of the control housing 332 (see FIG. 1) and through a self-opennig microswitch 352 which is held closed, when the mold carrier 74 is in its lowered position, by engagement of the member 170 secured to the carrier with a spring pressed plunger 354 of the microswitch. Energization of the relay TD1 causes closure of contacts TD1B, completing a holding circuit through the coil of the relay TD1 and through the closed pressure switch 326, and closing contacts TD1A in the circuit to the solenoid relay. The switch buttons 341, 342 may now be released, opening the switches 339, 340 and, by deenergizing the relay coil K4, closing contacts K4B to complete the circuit to the solenoid relay. Thus the solenoid 344 will be energized to operate the control valve 290 so as to connect the lower end of the cylinder 64 to the high pressure fluid passage 300 and, by forcing the piston 68 upward, to elevate the mold carrier 74 and bring the lower mold members 82 into position to apply molding pressure to the soles placed thereon against the upper mold members 86.

It has been stated earlier that the contacts K4B, which are connected in the circuit which controls the energization of the solenoid relay, are opened when the relay coil K4 is energized and the contacts K4A and K4C are closed. This is a safety device to insure that the control valve 290 will be in its down position when the solenoid is energized. It has also been stated that the contacts K4B are closed when the operator releases the switch buttons 341, 342. It will be apparent that the contacts K4B will not close and the solenoid 344 will not be energized unless the operator releases both switch buttons, which compels the operator to remove both his hands from the machine before the beginning of the operation of the hydraulic system.

As previously stated, when the solenoid 344 is energized and its plunger 348 is pulled up, the valve stem 292 is moved into a position in which the high pressure fluid passage 300 is connected to the line 306, so that fluid admitted into this line will flow through the open manually-controlled valve 308 into the line 318 and thence through the conduit 320 to the lower end of the cylinder 64, whereby the piston 68 will be moved up to raise the mold carrier 74 so as to cause the lower mold members 82 to apply molding pressure to the soles placed thereon against the upper mold members 86. During this upward movement of the piston, fluid from the upper end of the cylinder will be exhausted through the conduit 322, the line 312 and the exhaust passage 304. As soon as the predetermined maximum molding pressure has been developed (which, as previously stated, is approximately 2,000 p.s.i.), the pressure switch 326 will open and deenergize the coil of the time delay relay TD1. Thereupon the contacts TD1B will open instantly, contacts TD1C will close instantly, while contacts TD1A will close after a period determined by the setting of the time delay relay. The solenoid will thereby be deenergized and the valve stem 292 will be returned to its down position by a spring 356. Since, however, the microswitch 352, which was opened by disengagement of the member 170 secured to the mold carrier 74 from the plunger 354 of the microswitch when the mold carrier was moved up, is again closed by reengagement of the member 170 with the plunger 354 when the mold carrier reaches its lowered position, the circuit to the solenoid relay is in condition again to energize the solenoid to operate the machine through another cycle to mold the succeeding pair of soles. This automatic recycling of the machine will continue, under normal operating conditions, so long as the switch 350 is maintained in the closed position shown in the drawings.

If it is desired to operate the machine through a single cycle as, for example, during the period necessary to train an operator, or when making trial runs, the switch 350 must be moved to "open" position. Since this switch is connected in the holding circuit for relay K5, the holding contacts K5A also being in the circuit to relay TD1 which includes the recycling switch 352 which, as previously stated, is opened during upward movement of the mold carrier and closed by engagement of the member 170 with the switch plunger at the end of the downward movement of the carrier, the circuit to the relay TD1 will not be energized, so that the solenoid 344 cannot be operated to repeat the operation of the mold carrier.

It may also be desirable to operate the machine in a manner to permit raising and lowering the mold carrier 74 slowly, as, for example, after mounting a new set of cooperating mold members in the machine, so as to adjust the lower mold members in correct register with the upper mold members. For thus operating the machine, the switch 343 at the left hand side of the machine must be turned down to disconnect the circuit which controls the power operation of the hydraulic system. At the same time, the handle 310 of the manually operated valve 308 at the same side of the machine must be turned down to close the valve, and the handle 316 of the valve 314 turned up to open that valve. The control valve 290 being connected to the low pressure side of the hydraulic circuit, oil under low pressure admitted through the passage 302 into the interior of the valve housing in the space between the valve pistons 296, 298 will pass through the line 312 and the open valve 314 into the line 318, and thence through the conduit 320 into the lower end of the cylinder 64, and will pass from the line 312 through the conduit 322 into the upper end of the cylinder. The pressure applied against the lower face of the piston 68 will overcome the pressure exerted against the upper face of the piston, which has a lesser effective diameter than the lower face, due to the area occupied by the piston rod, and the piston will be moved up slowly to raise the mold carrier 74. To lower the mold carrier, the procedure just described must be reversed, that is to say, the valve 308 must be opened and the valve 314 closed. Oil under low pressure admitted to the control valve through the passage 302 will then pass through the line 312 and the conduit 322 into the upper end of the cylinder and force the piston to move downward, the oil below the piston then exhausting through the conduit 320, the line 318, the open valve 308, and the line 306 to the exhaust passage 304.

If it is desired to immobilize the mold carrier in an intermediate position after initiating its upward movement in the manner described above, the manually operated valve 314 must be closed as well as the valve 308. Oil under pressure trapped in the cylinder above and below the piston will then hold it against movement in either direction. To release the mold carrier for upward movement, the valve 314 must be opened to admit pressure fluid into the lower end of the cylinder, while maintaining the valve 308 closed; for producing downward movement of the carrier the valve 314 must be closed to cause pressure fluid to pass into the upper end of the cylinder, and the valve 308 opened to connect the lower end of the cylinder to exhaust.

If, after starting the machine, it should become necessary to stop it before it has completed a molding cycle, this may be accomplished by pushing in the switch 337 (FIG. 23) to open it, thereby deenergizing the relay coil K3 and opening contacts K3A so as to open the circuit and deenergize the solenoid 344. To reset the machine for operation the switch 337 must be pulled out to close its sets of contacts so as to enable the electric circuit to be again energized when the buttons 341, 342 are pressed to close the switches 339, 340.

Provision is made in the illustrated machine for automatically opening the circuit which controls the operation of the hydraulic power system without interrupting the running of the motor, to prevent damage to the sole transferring mechanisms due to jamming of the gear 250 and the gear segment 252 which may be caused by some obstruction to the inward relative movement of the gage finger carriers 212. Referring to FIG. 12, the microswitch 338 is mounted on a bracket 358 secured to the U-shaped arm 263, the plunger 360 of the microswitch normally engaging a member 362 carried by the lever 254 to keep the microswitch closed. The arrangement is such that, when the ram 266 is rotated counterclockwise, with reference to FIG. 12, during the upward movement of the mold carrier 74, as explained earlier, and moves the lever 254 to which it is connected by the rod 264 in the same direction, the gear segment 252 at the upper end of the lever will rotate the gear 250 and the arm 228 clockwise to move the gage finger carriers 212 inward. If, for any reason, the carriers are stopped in their inward movement before reaching the limit determined by the stop screws 267, further rotation of the arm 228, gear 250 and lever 254, will be stopped. Thereafter, as the upward movement of the mold carrier continues, the cam roll 260 in the cam groove 261 provided in the plate 262 which is secured to the mold carrier will, through the link 258, continue to rotate the shaft 256 in a counterclockwise direction. The lever 254 being at that time held against further movement, the arm or bracket 263 will continue rotating away from the lever, due to the yielding of the spring 265. The plunger 360 of the microswitch 338 will thus be disengaged from the member 362 carried by the lever and the microswitch will open. Opening of this switch which, as shown in FIG. 23, is connected in the holding circuit to the relay K3 which controls the operation of the control valve solenoid 344, will open this circuit and deenergize the solenoid, thereby causing the control valve 290 to return to its down position to cause downward movement of the carrier 74. As will be apparent, opening of the microswitch 338 will not in any way affect the circuit which controls the motor, which will continue to run without interruption.

Provision is also made whereby, after the inward relative movement of the gage finger carriers 212 has been stopped by engagement of the stop screws 267 with the blocks 221 and while the mold carrier 74 continues to move a slight distance upward, the microswitch 338 may be opened without breaking the circuit which controls the hydraulic power system. For this purpose there is provided a microswitch 376 which, as shown in FIG. 23, is connected in parallel with the microswitch 338. The housing 378 (FIG. 12) of the microswitch 376 is mounted on a bracket 380 secured to the machine frame. A spring pressed plunger 382 of the microswitch 376 extends horizontally slightly beyond the block 221 which mounts the inner end of the rod 218 on which the upper gage finger carrier 212, at the left-hand side of the machine, slides. The plunger 382 is in the path of the stop screw 267 carried by the block 223 which moves with the carrier 212, in such manner that, when the two carriers 212 reach the limit of their inward relative movement, as determined by engagement of the stop screws 267 with the respective blocks 221, the stop screw associated with the upper carrier 212 will contact the plunger 382 of the microswitch 376, thereby closing the switch to maintain the circuit which controls the hydraulic power system energized, despite the opening of the microswitch 338 in the manner previously explained.

Operation of machine

In the operation of the machine, the operator will load the two magazines 114 at the opposite sides of the machine (FIG. 1) with insoles, which may be all of the same size, or of assorted sizes, provided they are all for shoes of one particular style. If soles of different sizes are placed in the magazines, it is preferable, but not necessary, to locate the largest ones at the bottom of the stack and the smallest ones at the top, to insure free movement of the end gages 124, 126 to gage the successive lowermost soles. It will be understood that, prior to starting operation of the machine to mold insoles for shoes of a particular style, a set of cooperating mold members corresponding to that style will have been mounted in each of the two molding stations and will have been correctly registered relative to one another. This may be effected, as previously explained, by manually lifting the lower mold carrier 74 after having pressed the switch 343 down for manual operation and turned the handle 310 of the hand operated valve 308 down to close the valve and the handle 316 of the valve 314 up to open this valve, to admit fluid under low pressure to the lower end of the cylinder 64. It will also be understood that the pointer 190 (FIG. 2) will have been located in register with an indicium on the dial plate 196 corresponding to the ratio between the distance from the ball center of an insole, of any size but of the same style, to the toe end and the distance from the same point to the heel end. This setting of the pointer, which is mounted on the shaft 178 which carries the pinions 182 and 186, is effected by turning the knob 192 which is on the same shaft, whereby the pinion 186 (FIGS. 6 and 7), which meshes with the rack 188 on the lever 152 and constitutes one of the pivots about which the lever swings, is set in the position in which the lever, which is pivotally connected to the heel end gage 126, will impart to this gage movements relative to the toe end gage at rates varying in accordance with the previously mentioned ratios presented by soles for shoes of different styles. Once this setting has been made for gaging insoles for shoes of a particular style, the gages will gage insoles of all sizes of that style so as to locate the ball center of each insole longitudinally with relation to the corresponding point on each of the lower mold members 82.

The machine being thus readied for operation, the valve 308 being open and the valve 314 closed, and the switches 343 and 350 (FIG. 1) turned up for automatic power operation, the starter switch button 335 is next turned clockwise to start the motor 58 which drives the pump 52. The operator will next press the switch buttons 341, 342, closing the switches 339, 340 (FIG. 23) to energize the relay TD1, thus closing the contacts TD1A in the electric circuit which controls the solenoid relay, the operator then releasing the buttons, two holding circuits having then been completed, one through the relay contacts K5A, the closed hand switch 350, and the closed microswitch 352, the other through the closed pressure switch 326, and the relay contacts TD1B. When the solenoid 344 is energized, it pulls the stem 292 of the control valve 290 upward, whereupon pressure fluid is admitted to the lower end of the cylinder 64 to raise the piston 68, raising the mold carrier 74 to move the lower mold members 82 toward the upper mold members 86.

As the mold carrier 74 rises, and the arm or bracket 263 is rotated counterclockwise, as viewed in FIG. 12, through the cam groove 261 provided in the cam plate 262 which is fixed to the mold carrier, the cam roll 260, and the link 258, the lever 254 will be moved by the arm 263 in the same direction, and the gear segment 252 at the upper end of the lever will rotate the gear 250 clockwise, whereby the arm 228 which is mounted on the shaft 246 with the gear will turn in the same direction and the carriers 212 of the side gaging and transferring fingers 200, 202, 204 and 206 will be moved relatively inward toward the lower mold members 82. As soon as the carriers begin their inward relative movement, the gaging and transferring fingers, which are at that time located below the opening in the bottom of each magazine, are closed upon the lowermost insole in each magazine, engaging the insole at the opposite sides of its shank and heel breast lines to center the insole and position it widthwise with relation to the lower mold member, and transporting the sole in the gaged position to the lower mold member to receive molding pressure as this member is forced into the cavity of the upper mold member. It should be explained here that the first sole at the bottom of the stack in each magazine will have been positioned lengthwise by the end gages, before it is engaged by the side gaging fingers and transferred to the molding station, by manually lifting the actuator bar 162 (FIG. 6) which is connected to the means connecting together the end gages operating in each magazine. Thereafter the bar 162 will be lifted automatically, in each operating cycle of the machine, by engagement therewith of the striker or abutment plate 166 provided on the bracket 168 which is fixed to the mold carrier 74, as the latter nears the limit of its upward movement, to cause the end gages 124, 126 to be moved toward the opposite ends of the next lowermost insole in each magazine to position it lengthwise while the preceding pair of insoles are being molded.

The side gaging and transferring finger carriers 212 continue to move inward until stopped by engagement of the stop screw 267 (FIG. 12) carried by the block 223 on each carrier with the respective block 221 fixed to the frame. As soon as the predetermined molding pressure has been attained, the pressure switch 326 (FIG. 23) will open and deenergize the circuit which controls the solenoid relay, deenergizing the solenoid 344, whereupon the piston 68 and the mold carrier 74 will move downward. Disengagement of the abutment plate 166 from the actuator bar 162 allows this bar to be pulled down by the spring 164 (FIG. 6), whereby the end gages 124, 126 are moved away from the insole at the bottom of the stack in each magazine, so that it may be transported by the transferring fingers. At the same time, the clockwise rotation of the gear segment 252 (FIG. 12) will rotate the gear 250 counterclockwise and the arm 228 will turn in the same direction, causing the carriers 212 to move toward the magazines to engage the succeeding lowermost insole in each magazine.

As the pressure is lowered during the downward movement of the piston 68, the pressure switch 326 is again closed. Also, as the mold carrier 74 reaches the limit of its downward movement, engagement of the member 170 fixed to it with the plunger 354 of the microswitch 352, which was opened when the mold carrier was moved up, will again close this switch, reestablishing the circuit to energize the solenoid 344 to cause the machine to operate through another molding cycle, this automatic recycling of the machine continuing as long as the switch 350 is held closed.

During the return movement of the carriers 212, the sole ejectors 288 (FIG. 6) carried by the gaging and transferring fingers 200 will remove the insoles from the lower mold members 82, the insoles dropping into a receptacle provided at each molding station.

Although the invention has been herein described with reference to a twin sole molding machine, it is to be understood that it is not intended to limit the scope of the invention to a machine of that particular type, and that the features of the invention would be equally applicable to a single station machine adapted to operate on shoe soles or other articles.

Having described the invention, what we claim as new and desire to secure by Letters Patent of the United States is:

1. A machine for molding shoe soles and the like, comprising a pair of relatively movable mold members, means for moving one of said mold members toward and away from the other mold member, a magazine for holding a stack of soles to be molded, end gage members engageable with the toe and heel ends of the lowermost sole in the stack, means for moving said end gage members toward each other to position the sole lengthwise and for then moving the gages away from each other to release the sole, side gage members engageable with opposite sides of the sole after its release by said end gage members, and means for moving the side gage members to position the sole laterally and for subsequently moving them to locate the sole on one of the mold members.

2. A sole molding machine comprising mold members engageable with opposite faces of a sole, means mounted at one side of said mold members for supporting soles of different sizes to be molded, gage means for positioning a sole on the supporting means so that its ball line assumes a predetermined position lengthwise of said mold members, means for operating said gage means, other gage means for positioning the sole laterally in a predetermined position relative to said mold members, means for operating said other gage means to move them first in one direction to engage and position the sole and to move them thereafter in the opposite direction to carry the properly located sole between said mold members.

3. A machine for molding shoe soles and the like, comprising a pair of mold members one of which is movable into and out of molding relation with the other, a magazine for a stack of soles, means for removing the lowermost sole from the stack and carrying it into a position between the mold members, and means operative during operation of the removing means for positioning the next lowermost sole in the stack in a predetermined lengthwise position.

4. A machine for molding shoe soles and the like, comprising a pair of mold members one of which is movable into and out of molding relation with the other, a magazine for a stack of soles, means for removing the lowermost sole from the stack and carrying it into a position between the mold members, power means for moving the movable mold member, means operated by the movable mold member in its movement toward the other mold member for operating said removing means, and means operative during operation of the removing means for positioning the next lowermost sole in the stack in a predetermined lengthwise position.

5. A machine for molding shoe soles and the like, comprising a pair of mold members one of which is movable into and out of molding relation with the other, a magazine for a stack of soles, means for positioning the lowermost sole in the stack widthwise with respect to the mold members and for subsequently removing the sole thus positioned from the stack and carrying it into a position between the mold members, and means operative during operation of said positioning and removing means to locate the succeeding lowermost sole in the stack in a predetermined position lengthwise with respect to said mold members.

6. A machine for molding shoe soles and the like, comprising a movable mold member and a complemental stationary mold member, a carrier for the movable mold member, power means for imparting movement to the carrier, a magazine for a stack of soles, end gages movable in said magazine, means for moving said gages in response to movement of the mold carrier in one direction to engage the opposite ends of each sole in the magazine successively and shift the sole to position it lengthwise with relation to the movable mold member, and for moving the gages in response to movement of the mold carrier in the opposite direction to release the sole, side gages, means for moving said side gages to engage the sides of each sole in the magazine successively after its release by the end gages to position it widthwise with relation to the movable mold member, and means for moving said side gages in response to movement of the mold carrier in said one direction to transfer the sole in the gaged position and locate it on the movable mold member prior to completion of the movement of the mold carrier in said direction, and for moving the side gages away from the movable mold member to their starting positions in response to movement of the mold carrier in the opposite direction.

7. A sole molding machine comprising a movable mold member and a complemental stationary mold member, a carrier for the movable mold member, power means for moving the carrier to move the mold member thereon toward the stationary mold member, a magazine for a stack of soles, end gages movable in the magazine in one direction to engage the opposite ends of each sole in the magazine successively to shift it so as to position it lengthwise with relation to the movable mold member and in the opposite direction to release the sole after thus positioning it, side gages located in position to engage the sole after its release by the end gages to position it widthwise with relation to the movable mold member, means actuated by the operative movement of the mold carrier to move the side gages with the sole gripped between them toward the movable mold member to locate the sole thereon in the gaged position for receiving molding pressure, and other means also actuated by the operative movement of the mold carrier to move the end gages into engagement with the opposite ends of the succeeding sole in the magazine while the sole previously gaged and located on the movable mold member is being molded.

8. A sole molding machine comprising a movable mold member and a complemental stationary mold member, a carrier for the movable mold member, power means for operating the carrier during an operating cycle of the machine to move the mold member thereon into and out of pressure applying relation with the stationary mold member, a magazine for a stack of soles, end gages movable in the magazine toward and away from the opposite ends of each successive sole to position it lengthwise with relation to the movable mold member, means connecting the end gages for conjoint relative movement, an actuator, means connecting said actuator to said connecting means and operative in timed relation to the movements of the mold carrier into and out of its operative position to cause the actuator to impart to said end gages relative movement toward and away from the opposite ends of the sole in the magazine.

9. A sole molding machine comprising a movable mold member and a complemental stationary mold member, a carrier for the movable mold member, power means for operating the carrier during an operating cycle of the machine to move the mold member thereon into and out of pressure applying relation with the stationary mold member, a magazine for a stack of soles, end gages movable in the magazine toward and away from the opposite ends of each successive to sole to position it lengthwise with relation to the movable mold member, a lever connected to each end gage, means connecting the two levers to impart to the gages conjoint relative movements toward and away from the sole, an arm pivoted on one of said gage levers, an actuator secured to said arm, a striker on the mold carrier engageable with said actuator during operative movement of the mold carrier to move said arm and said levers in one direction to move the gages toward the opposite ends of the sole, a lever also pivoted to said one of said gage levers and movable with said arm in said one direction until stopped by engagement of the gages with the sole, a spring connecting said last-named lever and said actuator, whereby said lever and said actuator may continue their movement in said direction during continued movement of said actuator after engagement of the end gages with the sole, said spring causing said actuator and said lever to move in the opposite direction at the beginning of movement of the mold carrier to its starting position, to move said gage levers in a direction to move the end gages out of engagement with the sole.

10. A sole molding machine comprising a movable mold member and a complemental stationary mold member, a carrier for the movable mold member, power means for operating the carrier, a magazine for a stack of soles, a pair of end gages located in said magazine, means connecting the end gages and actuated by movement of the carrier to operative position to impart relative movement to the gages toward the opposite ends of each sole in the magazine successively to position it lengthwise with relation to the movable mold member, and means for varying the rate of relative movement of the end gages in accordance with variations in the styles of shoes for which the soles to be molded in the machine are intended, to gage soles of all sizes of any style.

11. A sole molding machine comprising a movable mold member and a complemental stationary mold member, a carrier for the movable mold member, means for imparting movement to the carrier in each operating cycle of the machine, a magazine for a stack of soles, end gages movable in the magazine toward and away from the toe and heel ends of each successive sole to position it lengthwise with relation to the movable mold member, a first lever connected to one of said end gages and mounted for swinging movement about a fixed pivot, a second lever connected to the other of said end gages and mounted for swinging movement about an adjustable pivot, linkage connecting the two levers, an actuator connected to the linkage, a member on the mold carrier engageable with the actuator when the carrier is moved in the direction to move the mold member thereon into pressure applying position to move the actuator in one direction to actuate the linkage so as to impart to the end gages relative movement toward the sole, and means for adjusting the pivot about which said second lever swings, thereby to vary the rate of movement of the end gage to which said second lever is connected relative to the end gage to which said first lever is connected to gage soles for shoes of different styles regardless of size.

12. A sole molding machine comprising a movable mold member and a complemental stationary mold member, a carrier for the movable mold member, means for operating the carrier, a magazine for a stack of soles, gage members engageable with the opposite sides of each successive sole in the magazine to position it widthwise with relation to the movable mold member, a carrier on which said gage members are mounted, and means connecting said gage carrier to said mold carrier in such manner as to render said connecting means operative during movement of said carrier in one direction to move the gage carrier and the gage members from the magazine toward the movable mold member to locate a sole thereon, and operative during movement of the mold carrier in the opposite direction to move the gage carrier and the gage members away from the movable mold member and toward the magazine in position to gage and transfer a succeeding sole.

13. A machine according to claim 12, wherein said means connecting the gage carrier to the mold carrier comprise a rotatable shaft, an arm secured to the shaft, a rod connecting the arm to the gage carrier, a gear on said shaft, a second shaft, a lever on said second shaft, a gear segment on said lever meshing with said gear, a link secured to said second shaft, a plate secured to the mold carrier, and cam means comprising a cam groove formed in said plate and a cam roll on said link engaging in said cam groove, whereby movement of the mold carrier into and out of operative position causes said cam means to rotate said gear and said arm to move the gage carrier toward and away from the mold member on the mold carrier.

14. A machine according to claim 12, wherein means are provided on one of the side gage members which, during the return movement of the gage carrier at the end of a molding operation, engage the molded sole and eject it from the movable mold member.

15. A sole molding machine comprising a movable mold member and a complemental stationary mold member, a carrier for the movable mold member, means for imparting operative movement to the carrier in each operating cycle of the machine, a magazine for a stack of soles, gage means engageable with the opposite sides of each successive sole in the magazine to position it widthwise with relation to the movable mold member, a carrier on which said gage means are mounted and which is normally located in a position in which said gage means may engage a sole in the magazine, connections between the mold carrier and the gage carrier, means associated with the mold carrier and operative during movement of the carrier into and out of its operative position to move the gage carrier toward and away from the movable mold member, and means effective when the mold carrier approaches the limit of its operative movement to cause the gage means to release the sole after locating it on the movable mold member, to permit this member to apply molding pressure to the sole against the stationary mold member.

16. A sole molding machine comprising a lower mold member and a complemental upper mold member, a vertically movable carrier for the lower mold member, a magazine for a stack of soles, gages located adjacent the magazine in position to engage the successive soles in the magazine and to position them widthwise with relation to the lower mold member, a carrier on which the gages are mounted, means connecting the gage carrier to the mold carrier and actuated by movement of the mold carrier to move the gage carrier toward the lower mold member to cause the gages to locate a sole thereon, springs tending to close the gages on each sole, toggle means pivotally connecting the gages and normally maintaining them in position to be closed by said springs, and cam members on the mold carrier acting on said toggle means at a predetermined time in the operative movement of the mold carrier to open the gages against the tension of said springs so as to release the sole after having located it on the lower mold member.

17. A sole molding machine comprising a movable mold member and a complemental stationary mold member, a carrier for the movable mold member, means for operating the carrier to move the mold member thereon into and out of cooperative relation with the stationary mold member, a magazine for a stack of soles, gages located adjacent the magazine in position to engage the successive soles in the magazine and to position them widthwise with relation to the movable mold member, a carrier on which the gages are mounted, connections between the gage carrier and the mold carrier, means on the mold carrier effective during movement of the carrier toward the stationary mold member to actuate said connections so as to move the gage carrier and the gages toward the movable mold member to locate a sole thereon, springs tending to close the gages upon the sole, toggle means pivotally connecting the gages and normally maintaining them in position to be closed by said springs, cam members on the mold carrier acting on said toggle means to cause the gages to release the sole at a predetermined time in the operative movement of the mold carrier, a first yielding member extending from the movable mold member and engageable with one face of the sole deposited thereon by the gages, and a second yielding member extending from the stationary mold member in register with said first member and engageable with the opposite face of the sole to clamp the sole after its release by the gages.

18. A sole molding machine comprising a movable mold member and a complemental stationary mold member, a carrier for the movable mold member, means for imparting movement to the carrier to move the mold member thereon into and out of cooperative relation with the stationary mold member, a magazine for a stack of soles, gages located adjacent the magazine in position to engage the successive soles in the magazine and to position them widthwise with relation to the movable mold member, a carrier on which the gages are mounted, connections between the gage carrier and the mold carrier, means on the mold carrier effective during operative movement of the mold carrier to actuate said connections so as to move the gage carrier and the gages toward the movable mold member to deposit a sole thereon, springs tending to close the gages so as to grip the sole, toggle means connecting the gages to each other and normally maintaining them in position to be closed by said springs, cam members on the mold carrier acting on said toggle means to cause opening of the gages to release the sole at a predetermined time in the operative movement of the mold carrier, a first yielding plunger extending from the movable mold member and engageable with one face of the sole deposited thereon by the gages, a second yielding plunger extending from the stationary mold member in register with said first plunger and engageable with the opposite face of the sole to clamp the sole after its release by the gages, and cam members on the magazine acting on said toggle means upon return of the gage carrier to its starting position to cause the gages to resume the position in which they may be again closed by the springs on a succeeding sole.

19. A sole molding machine comprising a lower mold member and an upper complemental mold member, a vertically movable carrier for the lower mold member, a magazine for a stack of soles, end gages operated in timed relation to the movement of the carrier to engage the opposite ends of each successive lowermost sole in the magazine to gage the sole in the position it is to occupy lengthwise on the lower mold, edge gages also operated in timed relation to the movement of the mold carrier to engage each sole successively at its opposite sides to gage it in the position it is to occupy transversely of the lower mold member, pressure fluid means for operating the mold carrier including a cylinder, a piston operating in the cylinder, a constantly driven pump for supplying pressure fluid to the cylinder, a solenoid operated valve for controlling the flow of pressure fluid to the cylinder, an electric circuit alternately closed and opened to energize and deenergize the control valve operating solenoid, a time delay relay in the circuit determining the opening of the circuit to deenergize the solenoid at the end of a molding cycle, a normally held closed microswitch connected in the circuit and opened upon upward movement of the mold carrier to permit the solenoid to be deenergized by deenergization of said time delay relay, said microswitch being closed upon return of the mold carrier to its starting position to permit reenergization of the solenoid to cause the machine to perform a molding operation upon a succeeding sole.

20. A machine according to claim 19, wherein said electric circuit also includes a manual switch which in one position maintains the circuit in condition to cause said solenoid to be reenergized by closing of said microswitch on each movement of the mold carrier to its starting position to recycle the machine, and which in another position renders the closing of said microswitch ineffective to reenergize the solenoid, whereby the machine will come to a stop at the end of a single operating cycle.

21. In a two station sole molding machine, a pair of movable mold members and a pair of cooperating stationary mold members, a carrier mounting both movable mold members, power means for operating the carrier, a pair of magazines for stacks of soles, gages associated with each magazine, means for moving said gages in response to movement of the mold carrier in one direction to engage the opposite ends of successive soles in both magazines and to position them lengthwise with relation to the movable mold members, and for moving the gages out of engagement with the soles in response to movement of the mold carrier in the opposite direction, side gages, and means actuated by movement of the mold carrier to move said side gages between a starting position in which they engage the opposite sides of successive soles in the two magazines after release of the soles by the end gages to position the soles widthwise with relation to the movable mold members and a position in which they locate the soles in the gaged position on said mold members prior to application of molding pressure to the soles.

22. In a two station sole molding machine, a pair of movable mold members and a pair of cooperating stationary mold members, a carrier mounting both movable mold members, power means for operating the carrier, a pair of magazines for stacks of soles, gages movable in each magazine, means actuated in response to movement of the mold carrier in one direction to cause said gages to engage the opposite ends of successive soles in both magazines and to position the soles lengthwise with relation to the movable mold members, and to cause them to move out of engagement with the soles in response to movement of the mold carrier in the opposite direction, and means operated to engage the successive soles after their release by said gages and to transfer them in the gaged position to the movable mold members prior to application of molding pressure.

23. In a two station sole molding machine, a lower mold member and a complemental upper mold member at each station, a vertically movable carrier on which both lower mold members are mounted, a magazine for a stack of soles at each station, a pair of end gages movable in each magazine in timed relation to the upward movement of the mold carrier toward the opposite ends of each successive lowermost sole in the magazine to position it lengthwise with relation to the respective lower mold member, means connecting together each pair of end gages, a lever connected to said connecting means, an arm pivoted for swinging movement with said lever, an actuator secured to each of said arms, a spring connecting each end of said actuator to each of said levers, a striker on said mold carrier engageable with said actuator at a determined time in the upward movement of the mold carrier to cause said arm and said lever to swing together in a direction to move each pair of end gages toward the lowermost sole in each magazine, said spring yielding after engagement of the end gages in one magazine with a sole of a certain size in that magazine and said lever thereafter swinging independently of said arm in said direction to permit continued movement of the end gages in the other magazine to gage a sole of a smaller size.

24. A machine according to claim 23, wherein said springs connecting the opposite ends of said actuator to the lever which is connected to each of the means connecting together the pair of end gages operable in each magazine become effective upon downward movement of said mold carrier to swing said lever in a direction to cause said connecting means to retract said end gages, and wherein there are provided at each molding station side gages which engage the opposite sides of each successive lowermost sole in each magazine after its release by the end gages to gage it widthwise with relation to each lower mold member, and which are operated in timed relation to the upward movement of the mold carrier in a succeeding operating cycle to transfer the sole in the gaged position to said lower mold member.

25. In a two station sole molding machine, a movable mold member and a complemental stationary mold member at each station, a carrier mounting the two movable mold members, power means for operating the carrier, a magazine at each station for a stack of soles, means in each magazine operated in timed relation to the operative movement of the mold carrier to engage the opposite ends of each sole in said magazine successively to position the sole lengthwise with relation to the movable mold member, side gages at each molding station operated in timed relation to the operative movement of the mold carrier to engage the opposite sides of each sole in each magazine successively to position the sole transversely of the movable mold member at each station, a carrier for each set of side gages, means connecting the two gage carriers to each other and to the mold carrier, and means effective to actuate said connecting means to impart to said gage carriers relative movement toward and away from said movable mold members in timed relation to the movement of the mold carrier toward and away from its operative position.

26. In a two station sole molding machine, a movable mold member and a complemental stationary mold member at each station, a carrier mounting the two movable mold members, power means for operating the carrier, a magazine at each station for a stack of soles, end gages movable in each magazine, means actuating said gages in timed relation to the operative movement of the mold carrier to engage the opposite ends of each sole in the magazine successively and to position the sole lengthwise with relation to the movable mold member, side gages operated in timed relation to the operative movement of the mold carrier to engage the opposite sides of each sole in each magazine successively and to position the sole transversely of the movable mold member at each station, a carrier for each set of side gages, means connecting the two gage carriers to each other and to the mold carrier, and means on the mold carrier effective upon movement of the mold carrier to its operative position to actuate said connecting means so as to impart relative movement to the gage carriers toward the movable mold members to cause the side gages to transfer the soles in the gaged position to said movable mold members, said means being effective upon return movement of the mold carrier to its starting position to actuate said connecting means so as to impart relative movement to the gage carriers toward the magazines to cause the gages to engage a succeeding sole in each magazine.

27. In a two station sole molding machine, a magazine at each station for a stack of soles, a lower mold member and a complemental upper mold member at each station, a vertically movable carrier for both lower mold members, gages operating at each station to engage successive soles in each magazine and to transfer them to the lower mold members, a carrier for the gages at each station, means connecting the two gage carriers to the mold carrier and to each other for equal and opposite movements toward and away from the lower mold members in timed relation to the movements of the mold carrier, power means for operating said mold carrier, an electric circuit controlling said power means, and a normally open microswitch connected in said circuit and normally held closed by engagement with the means connecting the gage carriers to the mold carrier, said microswitch being opened to open said electric circuit so as to stop further operation of the power means in case of malfunction of the means connecting the gage carriers to the mold carrier during the movement of the gage carriers toward the lower mold members.

28. In a two station sole molding machine, a magazine at each station for a stack of soles, a lower mold member and a complemental upper mold member at each station, a vertically movable carrier for both lower mold members, gages operating at each station to engage successive soles in each magazine and to transfer them to the lower mold members, a carrier for the gages at each station, means connecting the two gage carriers to the mold carrier and to each other for equal and opposite movements toward and away from the lower mold members in timed relation to the movements of the mold carrier, power means for operating said mold carrier, an electric circuit controlling said power means, stop members on each gage carrier for positively limiting movement of the carrier toward the respective lower mold member, power means for operating the mold carrier, an electric circuit controlling the operation of said power means, a first normally open switch connected in said circuit and normally held closed by engagement with said means connecting the gage carriers to the mold carrier, said switch being opened by continued upward movement of the mold carrier after movement of the gage carriers has been stopped by said stop members, a second normally open switch connected in the electric circuit in parallel with said first named switch and closed by engagement therewith of the stop member on one of the gage carriers, thereby to maintain the circuit closed despite the opening of said first switch.

References Cited in the file of this patent
UNITED STATES PATENTS 2,306,430    Eppler _____ Dec. 29, 1942
2,883,685    Willmott _____ Apr. 28, 1959